Sept. 17, 1963 E. M. DA SILVA 3,104,178

EVAPORATIVE COATING METHOD

Filed Dec. 23, 1960 2 Sheets-Sheet 1

INVENTOR
EDWARD M. DA SILVA

BY Frederick J. Smyth

ATTORNEY

Sept. 17, 1963 E. M. DA SILVA 3,104,178

EVAPORATIVE COATING METHOD

Filed Dec. 23, 1960 2 Sheets-Sheet 2

United States Patent Office 3,104,178

Patented Sept. 17, 1963

3,104,178

EVAPORATIVE COATING METHOD

Edward M. Da Silva, White Plains, N.Y., assignor to International Business Machines Corporation, New York, N.Y., a corporation of New York Filed Dec. 23, 1960, Ser. No. 78,038
1 Claim. (Cl. 117—106)

This invention relates to an evaporation method and apparatus therefore, and more particularly to an evaporation method for forming multilayer thin film electrical circuits and to an apparatus for practicing the method.

Thermal evaporation of a material within an evacuated chamber onto a substrate has been employed in the formation of a large variety of coated articles. Recently, this technique has been adapted to the formation of miniature electrical circuits wherein the circuit geometry is determined by the evaporation of a conductive material onto a substrate through a pattern defining mask. In this manner, high density electrical circuits are formed of thin electrical conductive films. Further, more complex circuits have been designed, particularly in the fields of magnetics and cryogenics, which require multilayer electrical conductive films insulated one from another. These various films are advantageously fabricated in quantity by vacuum deposition of the necessary materials.

As a result of the different thermal conductivity exhibited by electrically conductive and nonconductive materials, however, difficulties have been encountered in obtaining desirable uniform characteristics in each of the deposited films. A major difficulty results from the low thermal conductivity of most non-conductive materials which, upon heat being applied thereto, results in various "hot spots" developing in the material; the material thereupon spattering. Spattering is characterized by a large and uncontrollable amount of material suddenly being ejected from the material. This problem is not present during the thermal evaporation of most metals, since these metals exhibit a relatively high thermal conductivity and it is generally not possible to develop thermal gradients throughout the evaporant. This thermal problem is discussed at page 107 in the Vacuum Deposition of Thin Films, by L. Holland, published in 1958 by John Wiley and Sons.

Particle spattering during high vacuum evaporation has been a common occurrence when powder form insulating evaporants are employed. In order to reduce spattering, evaporation sources generally include a diverse path to the orifice of the source which may include a series of baffle plates to impede the particles and vapor path to the substrate. The effect of spattering from such a source is somewhat reduced at the expense of a substantial reduction in evaporation rate.

What has been discovered is a novel method and apparatus which combine together to provide improved thermal evaporation of materials, and which are particularly applicable in the evaporation of insulating films in multilayer electrical circuits. Briefly, the invention includes two independently controllable source structures. The first structure is a conventional receptacle which heats the evaporant charge to a temperature slightly below the evaporation temperature thereof. A second structure then directs radiant energy to the surface of the charge, thereby increasing the temperature of the surface above the evaporating temperature. This results in the charge being evaporated only from a thin surface layer. Additionally, the second structure, in the form of a screen or a mesh, is positioned intermediate the substrate and the first structure and is effective to intercept the particles, if any, which spatter from the charge.

An object of the invention is to provide an improved method of thermally evaporating materials.

Another object of the invention is to provide an improved method of fabricating multilayer electrical circuits.

Still another object of the invention is to provide an improved method of thermally evaporating nonmetallic charges.

Yet another object of the invention is to provide an improved evaporation source structure.

A further object of the invention is to provide an apparatus to reduce the spattering of the evaporant charge.

A still further object of the invention is to provide a method of reducing the spattering of insulating evaporants.

Yet another object of the invention is to provide an improved apparatus for thermally evaporating both metallic and nonmetallic evaporants.

The foregoing and other objects, features and advantages of the invention will be apparent from the following more particular description of a preferred embodiment of the invention, as illustrated in the accompanying drawings.

Figure 1:
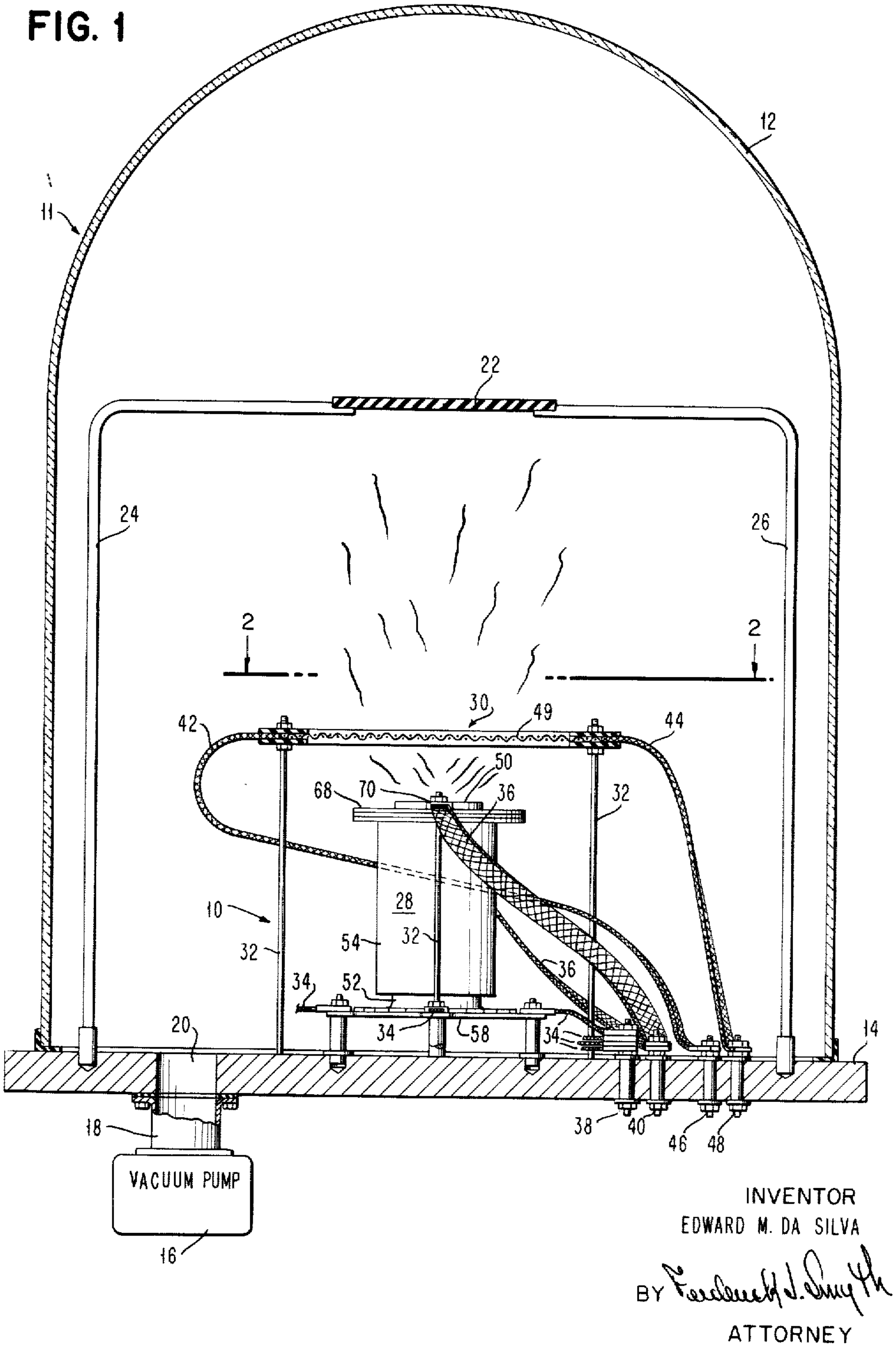
FIG. 1 is a diagrammatic illustration of the apparatus of the invention.

FIG. 1 illustrates the apparatus of the invention. As shown therein, an apparatus generally indicated as 10 is secured within an evacuatable chamber 11 consisting of a bell jar 12 secured to a base plate 14. Chamber 11 is evacuated by pump 16 through tubing 18 secured at an opening 20 in base plate 14. Positioned in the upper portion of chamber 11 is a substrate 22 in vertical alignment with apparatus 10 secured by means of rods 24 and 26.

Figure 2:
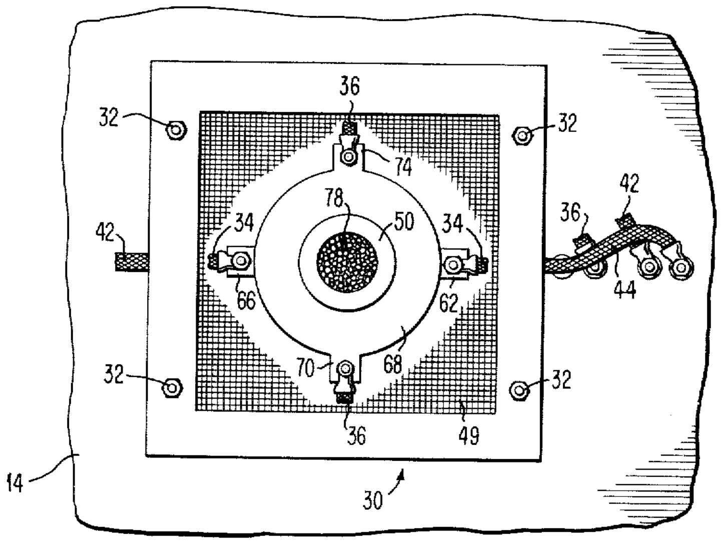
FIG. 2 is a section taken along lines 2—2 of FIGURE 1.

Structure 10 includes a first evaporation source 28 and a second evaporation source 30. These sources are secured to deck plate 14 by means of a plurality of spaced insulating rods 32. Energy is applied to source 28 by means of current flow through leads 34 and 36 which are connected by a pair of insulating feed thrus 38 and 40 in base plate 14 to a source of electrical potential (not shown). In a similar manner, energy is applied to source 30 by means of current flow through leads 42 and 44 connected by a second pair of insulated feed thrus 46 and 48 in base plate 14, to a second independently controllable source of electrical potential (not shown). As illustrated in FIGS. 1 and 2, source 30 is positioned immediately above source 28, effectively encompassing the entire surface area thereof. Source 30 consists of a screen, mesh, or other similar device 49 formed by the interconnection of a number of resistance wires, tapes, or rods.

Figure 3:
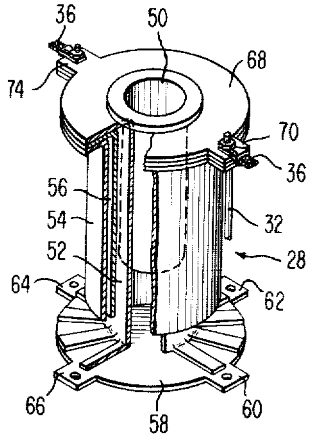
FIG. 3 is a sectional view of a portion of the apparatus of the invention.

As shown in FIG. 3, source 28 consists of a removable charge container 50 in thermal contact with a heater cylinder 52, and centered within a number of radiation shields 54 and 56. Heater cylinder 52, which may be fabricated of a refractory metal such as tantalum, is secured to a base plate 58 to which current lead 34 is connected. In order to reduce dissipation in lead 34 and base plate 58, it is desirable to construct lead 34 of four parallel conductors secured at 90° intervals on base plate 58, as indicated by tabs 60, 62, 64, 66 in FIG. 3. Cylinder 52 is also secured to an upper plate 68 to which current lead 36 is connected. Again, to reduce the power loss in lead 36 and upper plate 68, a pair of parallel conductors are employed connected to plate 68 at tabs 70 and 74 as indicated in FIG. 3. Two connections only are made to plate 68 in order to reduce heat conduction losses through lead 36, since upper plate 68 is maintained at a temperature greater than the temperature of base plate 58.

In employing the above briefly described apparatus in practicing the method of the invention, the procedure next described is followed. The material to be evaporated, indicated as 78 in FIG. 2 is placed within container 50 which is then positioned as shown in FIG. 1. A substrate 22 is positioned in vertical alignment with sources 28 and 30 and secured by rods 24 and 26. After the pressure within chamber 11 has been reduced to a predetermined value, by means of pump 16, energy is first applied to source 28 by current supply leads 34 and 36. This current flowing through resistive cylinder 52 supplies radiant thermal energy to cylinder 50. The current is adjusted to a level such that the material within container 50 is heated to a temperature slightly below the temperature at which the material evaporates at the predetermined pressure within chamber 11. Radiation shields 54 and 56, concentrically positioned about cylinder 52, are effective to direct essentially the entire amount of heat generated by cylinder 52 inwardly towards container 50 thereby increasing the efficiency of source 28. After the temperature of container 50 has stabilized, current is additionally directed through evaporation source 30 by means of conductors 42 and 44. This current flowing through the resistance wires forming the screen or mesh 49 generates additional thermal energy, a portion of which is directed downward towards the upper surface of container 50 as well as the upper surface of the material 78 contained therein. The current delivered to source 30 is controlled independently of the current delivered to source 28 and is adjusted so that the energy incident upon the material in container 50 is just effective to increase the temperature of a thin surface region above the temperature at which the material evaporates. The surface portion of the material then vaporizes and is directed upwardly through screen 49 towards substrate 22. Screen 49, in addition to applying thermal energy to material 78, is effective to intercept any large particles of the material, should spattering for any reason occur. Upon the desired thickness of the coating material being obtained on substrate 22, the currents delivered to each source 28 and 30 is terminated.

Although the procedure outlined above may be employed for any evaporant material, it is particularly effective for the evaporation of electrical insulating materials. By way of example, the materials generally employed include SiO, $CaP_2$, and $MgF_2$ which usually are available in powder form. Further, screen 49 of source 30 does not materially effect the evaporation rate obtainable, while affording a substantial improvement in the uniformity of the deposited film surface, as observed through the aid of a microscope. That is, as a typical illustration, screen or mesh 49 is generally of size 30 x 30 for the above described insulating materials.

In the fabrication of multilayer electrical circuits, it is necessary to employ more than a single evaporation structure illustrated as 10 in FIG. 1. One or more of these additional structures contain the materials for forming the required electrically conducting thin films and one or more of these structures contain the material for forming the insulating layers. Each of these evaporation source structures can be that illustrated in FIG. 1, or alternatively, conventional evaporation source structures may be employed for the electrically conductive materials, if desired. Additionally, in order to form thin film layers in predetermined geometrical configurations, it is necessary to interpose one or more pattern defining masks intermediate the source structures and the substrate. An apparatus for forming multiplayer electrical circuits upon a plurality of substrates is shown in co-pending application Serial Number 839,219, filed September 10, 1959, now Patent No. 3,023,727, on behalf of Nicholas Theoeoseau et al. and assigned to the assignee of this application. The apparatus shown therein includes a plurality of pattern defining masks, a plurality of substrates, and a plurality of evaporation source structures, and mechanical means for positioning the substrates with respect to any mask and evaporation source structure. The evaporation source structure described in this application is directly adaptable for use in the above reference apparatus.

It should be noted that evaporation source 28 has been particularly designed to maintain the evaporant charge at a constant temperature which is easily established as well as maintained. This results since the evaporant material is made independent of the current path supplying the thermal energy with the material supported within a charge container secured concentrically with the cylindrical resistance heater. Under these conditions, the resistance, radiation, and conduction losses are constant. The evaporant in the container, therefore, assumes an equilibrium temperature from the continuous thermal radiation directed thereto. The power input necessary to maintain a particular temperature in source 28 is dependent only upon supporting the energy losses due to radiation and conduction. Since each of these are constant, one may associate a particular power input to source 28 with the particular temperature of the evaporant charge. Upon the addition of radiant energy supplied by source 30, the solid angle of the vapor path from source 28 directed towards source 30 is relatively small, and the distribution pattern is symmetric about the source center and closely approximates that of the small directed point source.

Although the evaporant structure 10 consisting of source 28 and source 30 is primarily directed to the evaporation of materials which exhibit low thermal conductivity, the above described method can additionally be employed to evaporate materials which exhibit a high thermal conductivity. Alternatively, the evaporant source 10 can be used as a conventional source structure for materials which exhibit a high thermal conductivity such as metals. If desired, the energy supplied to source 28 may be sufficient of, and by itself, to vaporize the evaporant material, it being unnecessary then to supply energy to source 30. Under these conditions, mesh 49 is only effective to impede the travel of large particles. Further, if desired, energy can also be supplied to source 38. In this latter method, the volatized matter encountering mesh 49 is heated to a temperature greater than that a which evaporation source 28 is maintained. This additional temperature is effective to impart additional energy to the vaporized material, causing high acceleration of the material. Further, particles intercepted by screen 49 are reevaporated and directed towards the deposition area.

What has been described is a novel method of evaporating materials which is particularly effective in the evaporation of materials exhibiting low thermal conductivity. In combination therewith, an apparatus has also been described which is effective not only to practice the method of the invention, but also to practice the methods of the prior art when materials exhibiting high thermal conductivity are to be evaporated.

While the invention has been particularly shown and described with reference to a preferred embodiment thereof, it will be understood by those skilled in the art that various changes in form and details may be made therein without departing from the spirit and scope of the invention.

What is claimed is:

A method of evaporating a body of an insulating material exhibiting low thermal conductivity onto a substrate within an evacuated chamber effective to evaporate said material without said material spattering, which method comprises; subjecting said body to a first source of thermal energy; said first source effective only to uniformly increase the temperature of all of said body of material to a temperature below the temperature at which said material evaporates; and thereafter resistively heating a screen positioned between said body and said substrate, said heated screen effective in combination with said first source to increase the upper surface only of said body of material to a temperature above the evaporation temperature of said material; and said heated screen being further effective to intercept and re-evaporate any relatively large particles of said vaporized material, thereby preventing said large particles from arriving at said substrate.

References Cited in the file of this patent

UNITED STATES PATENTS 2,932,588 Frank ---------------- Apr. 12, 1960

FOREIGN PATENTS 483,029 Great Britain ----------- Apr. 11, 1938

UNITED STATES PATENT OFFICE

CERTIFICATE OF CORRECTION

Patent No. 3,104,178 September 17, 1963

Edward M. Da Silva

It is hereby certified that error appears in the above numbered patent requiring correction and that the said Letters Patent should read as corrected below.

Column 3, line 44, for "$CaP_2$" read -- $CaF_2$ --; line 66, for "multiplayer" read -- multilayer --.

Signed and sealed this 4th day of August 1964.

SEAL)
Attest:

ERNEST W. SWIDER
Attesting Officer

EDWARD J. BRENNER
Commissioner of Patents